E. W. BAUER.
MILK OR CREAM BOTTLE RECEPTACLE.
APPLICATION FILED APR. 11, 1910.
1,024,548.
Patented Apr. 30, 1912.
2 SHEETS—SHEET 1.
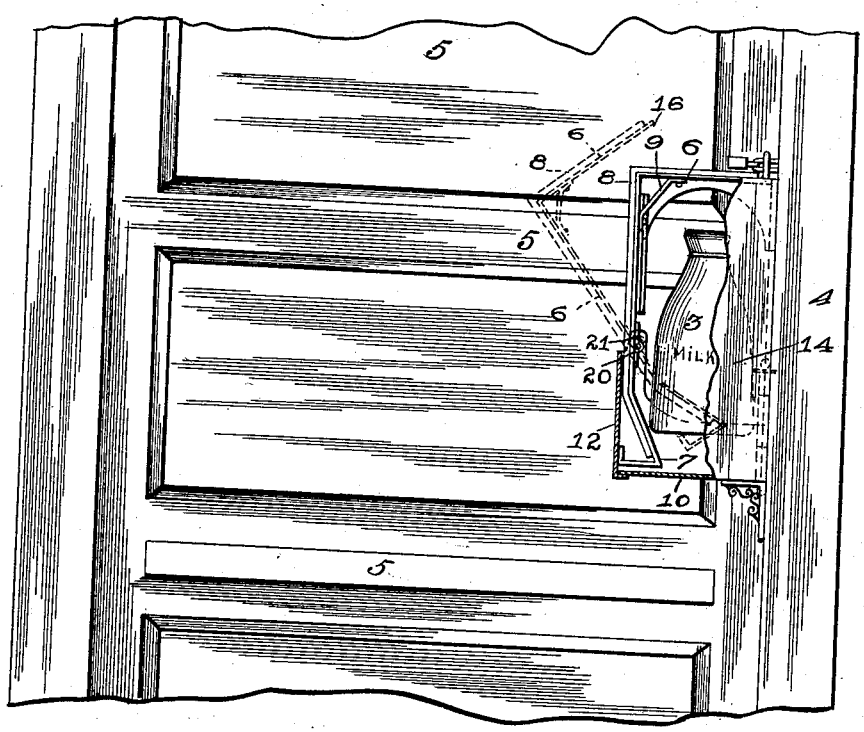
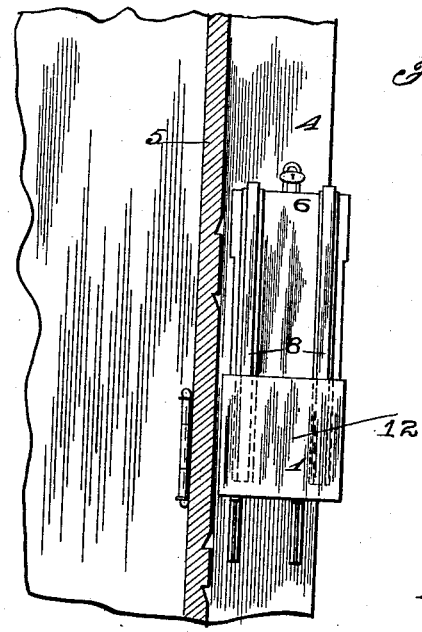
Witnesses
M. L. Lessing
B. G. Richards
Inventor
Egbert W. Bauer
By Joshua R. Potts
His Attorney E. W. BAUER.
MILK OR CREAM BOTTLE RECEPTACLE.
APPLICATION FILED APR. 11, 1910.
1,024,548.
Patented Apr. 30, 1912.
2 SHEETS—SHEET 2.
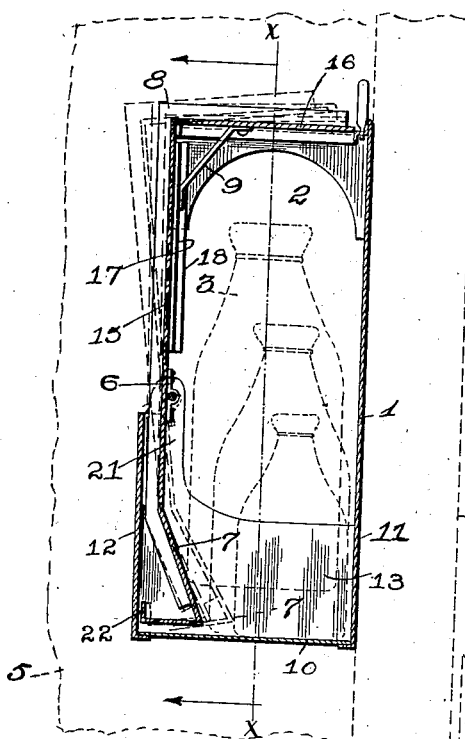
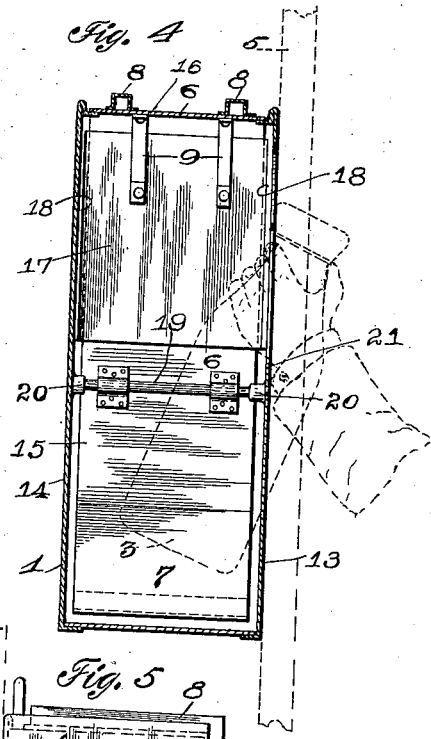
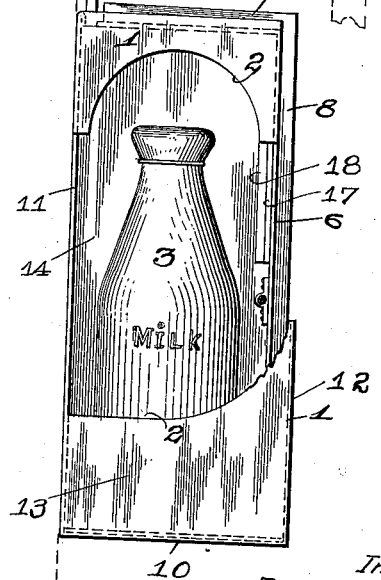
Witnesses
M. L. Lessin
B. G. Richards
Inventor
Egbert W. Bauer
By Joshua R. H. Potts
His Attorney

UNITED STATES PATENT OFFICE.

EGBERT W. BAUER, OF CHICAGO, ILLINOIS.

MILK OR CREAM BOTTLE RECEPTACLE.

1,024,548.

Specification of Letters Patent. Patented Apr. 30, 1912.

Application filed April 11, 1910. Serial No. 554,683.

*To all whom it may concern:*

Be it known that I, EGBERT W. BAUER, a citizen of the United States, residing at Chicago, county of Cook, and State of Illinois, have invented certain new and useful Improvements in Milk or Cream Bottle Receptacles, of which the following is a specification.

My invention relates to improvements in milk and cream bottle delivery receptacles and has for its object the production of such a receptacle in which a bottle will be locked by the insertion thereof and readily removed when a door, against which the receptacle is located, is opened.

A further object of the invention is to provide such a receptacle which shall be of simple construction and efficient in operation.

The invention consists in the combination and arrangement of parts which will be hereinafter fully described and more particularly pointed out in the appended claims.

The invention will be more readily understood by refernce to the accompanying drawings forming a part of this specification, and in which, Figure 1 is a partial elevation of the exterior of a door illustrating the receptacle as in use, Fig. 2, an elevation at right angles to Fig. 1, Fig. 3, an enlarged section of the bottle receptacle, Fig. 4, a section on line *x—x* of Fig. 3, Fig. 5, an elevation of the receptacle from the door side, and Fig. 6, a top plan view of the receptacle.

Referring now to the drawings 1 indicates a receptacle comprising a bottom 10, sides 11 and 12 and inner wall 13 and an outer wall 14. The bottom 10 is made of sufficient size to receive the desired number of milk bottles 3. The side 11 extends unbroken the full height of the device and is adapted to be secured against a door frame 4 so that the door 5 will close against the inner wall 13 as shown in Fig. 4, and the outer wall 14 is co-extensive in height with the wall 11. The side wall 12 extends upwardly from the bottom 10 a distance preferably less than half the height of the device for a purpose which will appear hereinafter, and the inner wall 13 is cut away to form a large opening 2 through which access may be had to the receptacle after the door 5 is opened for removing the milk bottle.

The receptacle is provided with a closure 6 comprising a vertical portion 15 which, when closed, completes the side 12 and a horizontal top portion 16. The portions 15 and 16 are formed of one piece of material or are rigidly secured together and braced by diagonally disposed braces 9. The portions 15 and 16 are of appreciably less width than the distance between the walls 13 and 14 to allow free swinging of the closure and a plate 17 is secured to the inner face of the upper portion of the part 15 above the wall 12. This plate extends the full width of the device and has its vertical edges turned inwardly forming flanges 18 which fit snugly between the walls 13 and 14. The device is preferably formed of sheet metal and 8 indicates stiffening ribs extending longitudinally of the portions 15 and 16. The closure is mounted to swing upon a horizontal transverse rod 19 having bearings 20 in the walls 13 and 14, the outer edge of the wall 13 being extended upwardly as at 21 for this purpose. The lower end of the vertical portion 15 of the closure is bent inwardly forming an inclined bottom portion 7 which extends almost to the bottom 10 of the receptacle and is then bent backwardly at right angles to the portion 15 terminating in an upturned portion or flange 22 to abut the inner face of the wall 12 and form a stop for the closure.

When the receptacle is empty the closure 6 is free to swing to open the upper end of the device for placing a milk bottle within the same. When a quart bottle is placed within the receptacle the edge of its lower end rests against or upon the lower portion of the inclined part 7 of the closure but smaller bottles will rest directly upon the bottom 10. It is obvious that in either case the bottle within the receptacle will securely lock the closure so that it cannot be opened until after the bottle is removed through the opening 2 in the inner wall 13.

Having described my invention what I claim as new and desire to secure by Letters Patent is:

1. In a device of the class described, a receptacle comprising a fixed bottom and vertical side walls, one of said side walls being provided with a removal opening and another of said walls being cut away for a greater portion of its height, a closure comprising a vertical portion and a horizontal top portion rigidly connected thereto, said vertical portion being hinged on a horizontal axis above the upper edge of the cut away wall of the receptacle and having its lower end extending into the lower portion of said receptacle, said lower end being inclined inwardly and then turned back at right angles to the vertical portion terminating in a vertical flange adapted to abut the adjacent wall of the receptacle, substantially as described.

2. In a device of the class described, a receptacle comprising a fixed bottom and vertical side walls, one of said walls being provided with a removal opening and another of said walls being cut away for a greater portion of its height, a closure comprising a vertical portion and a horizontal top portion rigidly connected thereto, said vertical portion being arranged to complete the cut away side wall when in closed position and being of less width than the distance between the side walls adjacent said cut away wall, said closure being hinged upon a horizontal axis, a plate fixed to said vertical portion above the upper edge of said cut away wall and extending the full width of the device and the edges of said plate being provided with inturned flanges to engage said adjacent side walls, substantially as described.

In testimony whereof I have signed my name to this specification in the presence of two subscribing witnesses.

EGBERT W. BAUER.

Witnesses:
JANET E. HOGAN,
JOSHUA R. H. POTTS.